March 10, 1970     R. J. BAIER     3,499,691

COMBINATION DAMPED SHAFT SUPPORT

Filed Dec. 22, 1967

INVENTOR
ROBERT J. BAIER

BY Matthew P. Lynch
Robert J. McDonnell
ATTORNEYS 3,499,691
COMBINATION DAMPED SHAFT SUPPORT
Robert J. Baier, Claymont, Del., assignor to The Boeing
Company, Seattle, Wash., a corporation of Delaware
Filed Dec. 22, 1967, Ser. No. 692,898
Int. Cl. F16c 17/16, 27/00
U.S. Cl. 308—9                                   13 Claims

ABSTRACT OF THE DISCLOSURE

A shaft, which rotates at supercritical speeds, is supported intermediate its ends by a structure that dampens vibrations of the shaft. The shaft has a cylindrical member fixed thereto and adapted to be rotatably supported within the inner of a plurality of concentric rings, which are mounted within a fixed housing. The spaces between the concentric ring are selected to ensure damping when the shaft rotates at a speed greater than a predetermined speed and have pressurized oil introduced therein to function first as a hydrodynamic bearing to allow shaft rotation and second as an energy absorbing medium for the vibrations of the shaft. When the speed of the shaft is no greater than the predetermined speed, a second damper structure, which surrounds the concentric rings and also is suported by the fixed housing, dampens the vibrations of the shaft. This second damping structure includes a pair of adjacent chambers, which are filled with fluid and have an elastomer wall that is responsive to vibrations created by the shaft when its rotating speed is no greater than the predetermined speed.

---

Figures 1, 2:
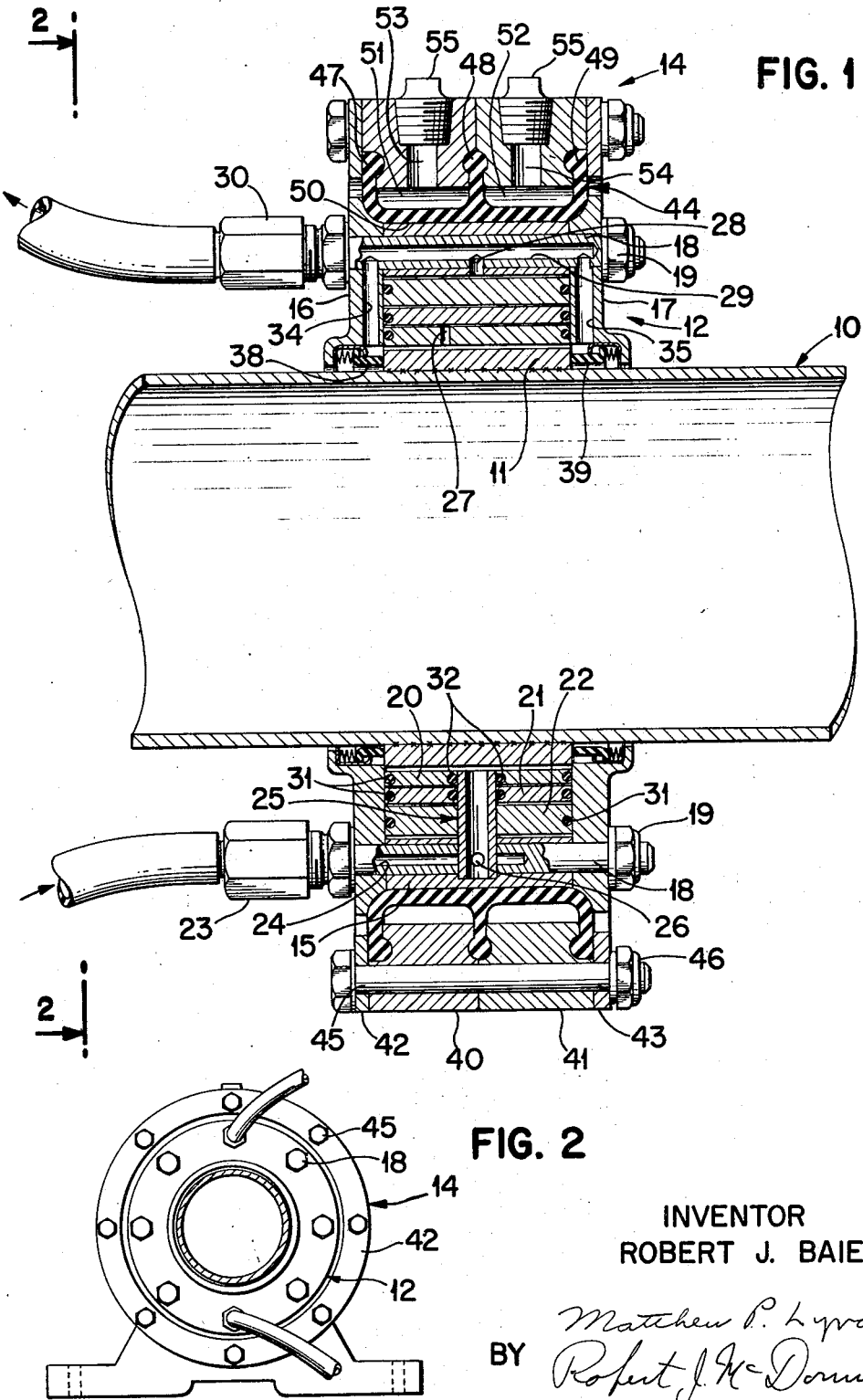

This invention relates to a supercritical speed shaft, and more particularly, to a structure for both damping and supporting a supercritical speed shaft.

A shaft has a plurality of critical speeds, with each of the critical speeds occurring when the speed of rotation of the shaft equals one of the frequencies of the shaft's natural vibrations. For the shaft's lowest mode of natural frequency, the critical speed of the shaft is known as the first critical speed. These frequencies of natural vibrations are a function of the shaft's geometric dimensions and physical characteristics such as the length, shape, and density as well as the non-homogeneity of shaft material.

When an undamped shaft operates at one of its critical speeds, the deflection resulting from unbalanced forces frequently causes the shaft to either fail or cause physical damage to its support structure. Thus, the lack of positive deflection control for shafts rotating at critical speeds has limited their use. Shafts which operate near or above their first critical speed are considered to be operating in their supercritical speed range.

As a result, shafts have previously been operated below their first critical speed in order to avoid deflection and resulting vibration. However, to maintain subcritical operation, shaft diameters have had to be large, and the lengths of their individual sections have had to be kept short. Accordingly, it has been necessary to empoly additional adapters, fittings, bearings, and hangers to support the various portions of the subcritical rotating shaft.

Additionally, subcritical power transmission shifting incudes both economic and weight penalties. Both of these penalties, and particularly the weight penalty, are problems in the aircraft field, where weight reduction is an important requisite. In helicopters, for example, a power shaft is employed in the transmission system to transmit power the entire length of the fuselage. Thus, the additional adapters, fittings, bearings, and hangers, as well as the large shaft diameters, create a substantial weight increase with its attendant disadvantages.

The present invention provides for a method and apparatus for controlling shaft deflections by damping the forcing function which causes shaft deflections. Accordingly, the invention provides for shaft operation at or above the shaft's first critical speed. Thus, the shaft may be of smaller diameter, longer length, and have less supporting structure. Accordingly, a substantial cost and weight reduction is obtained when employing the present invention with a high-speed shaft system. Additionally, the present invention provides the advantages of supercritical speed shafts while maintaining the weight of the damper structure at a minimum.

Since the weight of any moving elements supporting a shaft affects the motions of the shaft, it is desirable to reduce such moving elements to as small a mass as practical. It also is desirable that the mass of such moving elements be decreased as the speed of the shaft increases since the effects thereof become more pronounced with an increase in speed.

The present invention satisfactorily overcomes the foregoing problem by utilizing a damper structure having a plurality of concentric rings, in which the larger mass of the outer rings does not move at the higher critical speeds of the shaft. Accordingly, a shaft utilizing the damper structure of the present invention does not have as large an orbiting mass at higher critical speeds as at lower critical speeds, and, therefore, adequate damping of the shaft is provided at all speeds.

Because presently available dampers for a shaft operating at supercritical speeds have a substantial number of parts which move with the shaft and cause an increase in the amplification factors, more precise balancing of the shaft is required. The present invention satisfactorily overcomes this problem by either eliminating the requirement for balancing a supercritical shaft through its first ten critical speeds if the unbalance of the shaft is not too great or making balancing less critical by reducing the amplification factor.

It is necessary to damp the larger amplitude of deflection of the shaft at lower critical speeds, where the concentric rings may not provide sufficient motion for efficient damping. The present invention satisfactorily meets this problem by utilizing a separate damping structure, which is part of the overall damper structure, to control only these larger orbital motions.

An object of this invention is to provide a relatively lightweight damping structure for supercritical speed shafts.

Another object of this invention is to provide a damping structure for supercritical speed shafts without increasing the weight or mass of the shaft.

A further object of this invention is to provide variable damping for supercritical speed shafts in which the concentric moving elements will resist motion in proportion to their mass as the speed of the shaft increases and thereby increase the damping coefficient.

Still another object of this invention is to provide a damping structure for supercritical speed shafts in which the mass of the moving elements of the damping structure is reduced as the speed of the shaft increases.

A still further object of this invention is to provide a hydrodynamic bearing for shaft support without adding the complexity and weight of necked-down adapters.

Other objects of this invention will be readily perceived from the following description, claims, and drawing.

This invention relates to the combination of a rotating shaft having a member secured thereto and supporting means cooperating with the member to rotatably support the shaft intermediate its ends. The supporting means has first damping means disposed adjacent the cylindrical member and surrounding the member to dampen vibrations of the shaft when the shaft exceeds a predetermined speed. The supporting means also has second damping means disposed adjacent the first damping means to dampen vibrations of the shaft when the shaft rotates at a speed no greater than the predetermined speed.

This invention also relates to a damping and support assembly for a rotating shaft. The assembly comprises first damping means adapted to rotatably support the shaft and dampen vibrations of the shaft when the shaft exceeds a predetermined speed. The assembly also has second damping means cooperating with the first damping means to dampen vibrations of the shaft when the shaft rotates at a speed no greater than the predetermined speed.

The attached drawing illustrates a preferred embodiment of the invention, in which:

FIGURE 1 is a sectional view of a shaft having the damper structure of the present invention supporting the shaft intermediate its ends; and FIGURE 2 is an end elevational view, partly in section, taken along line 2—2 of FIGURE 1.

Referring to the drawing, there is shown a shaft 10 adapted to be rotated at supercritical speeds for transmitting torque from a power source to a point remote from the power source. Intermediate its ends, the shaft 10 has a collar 11, which is a hollow cylindrical member, fixedly secured thereto by suitable means such as welding, for example. The collar 11 is preferably formed of aluminum having an outer surface of hard chrome plate to function as a bearing surface.

The collar 11 is rotatably supported within an inner housing 12. The inner housing 12 is fixedly secured to an outer housing 14, which is supported by a suitable fixed structure.

The inner housing 12 includes a hollow cylindrical member 15 and retaining plates 16 and 17 secured to opposite ends of the hollow cylindrical member 15. The retaining plates 16 and 17 are secured to the hollow cylindrical member 15 by bolts 18 and nuts 19.

The inner housing 12 has concentric rings 20, 21, and 22 disposed therein with the ends of the rings 20–22 in juxtaposition to the retaining plates 16 and 17. The rings 20–22 are spaced predetermined distances from each other when the shaft 10 is at rest to form annular spaces therebetween.

Similarly, the inner bearing surface of the concentric ring 20 is spaced a predetermined distance from the hard chrome plate, outer surface of the collar 11. Likewise, the outer bearing surface of the outer ring 22 is spaced a predetermined distance from the inner bearing surface of the cylindrical member 15.

A suitable pressurized fluid such as oil from a suitable pressure source (not shown) is transmitted to the interior of the inner housing 12 to fill the spaces or clearances between and about the rings 22–22 with pressurized oil. The oil is supplied from the source through a fitting 23 to a passage 24 in one of the bolts 18.

A hollow cylindrical standpipe 25, which is secured in position by a light-press fit with the outer concentric ring 22, has an opening 26 communicating with the passage 24. The standpipe 25 extends through aligned oversize openings in the rings 20 and 21. The oversize openings in the rings 20 and 21 permit the rings 20 and 21 to move relative to the standpipe 25.

The passage in the standpipe 25 will permit pressurized oil to flow from the interior of the standpipe 25 into the clearance or space between the collar 11 and the concentric ring 20. The rings 20, 21, and 22 have passages 27 therein to allow the pressurized oil to work its way from the collar 11 to the outer bearing surface of the outer concentric ring 22. While only one of the passages 27 is shown, each ring has a similiar non-coincident passage. The oil then flows through an exhaust port 28 in the cylindrical member 15 and another of the bolts 18 to a passage 29 in the bolt 18 having the port 28. The passage 29 connects through a fitting 30 on the bolt 18 having the passage 29 to return the oil to its source of pressure.

Seals 31, which are preferably O-rings, are mounted in each of the ends of the concentric rings 20–22 to prevent the flow of oil between the ends of the rings 20–22 and the retaining plates 16 and 17. Seals 32, which are preferably O-rings, are disposed in the walls of the rings 20 and 21 defining the openings through which the standpipe 25 extends. This prevents flow between the standpipe 25 and the rings 20 and 21.

Each of the retaining plates 16 and 17 has a passage 34 and 35, respectively, therein. The passages 34 and 35 permit any excess pressurized oil to flow from the space or clearance between the ring 20 and the collar 11 into the passages 29 and back to its pressure source.

A high-speed, carbon-face seal 38 seals the passage 34 against loss of oil by bearing against one end of the collar 11. A high-speed, carbon-face seal 39 seals the passage 35 against loss of oil by bearing against the other end of the collar 11.

The outer housing 14 includes a pair of hollow cylindrical members 40 and 41, annular end members 42 and 43, and a resilient or flexible member 44. The hollow cylindrical members 40 and 41 are disposed adjacent each other with the annular end members 42 and 43 on the ends thereof. Bolts 45 and nuts 46 secure the hollow cylindrical members 40 and 41 and the annular end members 42 and 43 to each other to form a unitary assembly.

Furthermore, the flexible member 44, which is formed of a sutiable elastomeric material, is also part of the housing 14. The flexible member 44 has tangs 47, 48, and 49 extending therefrom. The tang 47 is disposed between the annular end member 42 and the hollow cylindrical member 40 within a recess in the hollow cylindrical member 40. The annular end member 42 clamps the tang 47 within the recess in the hollow cylindrical member 40.

Similarly, the tang 49 is retained in a recess in the hollow cylindrical member 41 by the annular end member 43. The intermediate tank 48 of the flexible member 44 is retained in a receptacle, which is formed in the adjacent surfaces of the two hollow cylindrical members 40 and 41. Each of the tangs 47–49 has an enlarged end to insure its retention.

The flexible member 44 has its inner annular surface 50 bonded to the inner housing 12 by vulcanizing or the like. Accordingly, the inner housing 12 and the outer housing 14 are secured to each other whereby both are fixedly mounted.

The flexible member 44 cooperates with the cylindrical members 40 and 41 of the outer housing 14 to form a pair of annular chambers 51 and 52 therein. Each of the annular chambers 51 and 52 is concentric with the rings 20–22.

Fluid such as oil, for example, may be added to the chamber 51 through a passage 53 in the hollow cylindrical member 40. Likewise, fluid such as oil, for example, may be added to the chamber 52 through a passage 54 in the hollow cylindrical member 41. Each of the passages 53 and 54 is closed by a plug 55.

Considering the operation of the present invention, oil would be continuously supplied under pressure to the interior of the inner housing 12 through the standpipe 25. This oil flows into the space or clearance between the ring 20 and the collar 11 and works its way through the passages 27 (one shown in the ring 20) in the rings 20, 21, and 22 to the exhaust port 28.

This pressurized oil tends to center both the shaft 10 and the concentric rings 20–22. The orbiting motions of the shaft 10, due to vibrations, reduce the spaces or clearances, which have been specially designed, between the rings 20–22. This forces the oil to move around to the other side of each of the rings causing an absorption of energy whereby the lateral motion of the shaft 10 is dampened.

When the shaft 10 is rotating at speeds below a predetermined speed, the amplitude of the vibrations is relatively high. This results in the concentric rings 20–22 bottoming out and moving with the lateral motions of the shaft 10. These vibrations are then transmitted by the relatively rigid inner housing 12 to the outer housing 14 wherein the vibrations are absorbed by the fluid within the chambers 51 and 52.

These lateral motions of the shaft 10 cause deflection of the flexible member 44 whereby the fluid within the annular chambers 51 and 52 is moved to the opposite side of each of the chambers 51 and 52. This results in absorption of energy to dampen the lateral motions of the shaft 10.

Accordingly, at relatively low speeds, the rings 20–22 and the inner housing 12 move with the lateral motion of the shaft 10. As previously mentioned, these low-speed motions are damped by the fluid within the chambers 51 and 52 due to compression of portions of the flexible member 44 by the movement of the inner housing 12 relative to the outer housing 14.

As the speed of the shaft 10 increases, the inner housing 12 tends to remain static so that the spaces between the rings 20–22 provide the damping action to the shaft 10. Because the inner housing 12 is relatively static when the shaft 10 exceeds a certain predetermined speed, the orbiting mass is reduced as the speed increases. Furthermore, this results in no appreciable damping by the fluid within the annular chambers 51 and 52 at supercritical speeds since there is little or no movement or compression of the flexible member 44 at these speeds.

While the two annular chambers 51 and 52 have been shown, it should be understood that only a single annular chamber or more than two annular chambers can be employed. It is preferable to utilize two or more annular chambers so that there will still be damping at low speeds even if the flexible member 44 should fail at some point.

An advantage of this invention is that it provides support to a continuous shaft operating at supercritical speeds without requiring heavy adapters. Another advantage of this invention is that the amplification factor of the vibrations of a supercritical speed shaft is reduced. A further advantage of this invention is that it either reduces the need for balancing shafts operating at supercritical speed or makes balancing less critical. Still another advantage of this invention is that it requires fewer parts and is of lower cost than presently available damping structures for shafts operating at supercritical speeds. A still further advantage of this invention is that it provides a damping coefficient which is variable with speed to more nearly match the damping required by the shaft throughout its speed range.

What is claimed is:

1. In combination, a rotating shaft, a member secured to said shaft, means cooperating with said member to rotatably support said shaft intermediate its ends, said means having first damping means disposed adjacent said member and surrounding said member to dampen vibrations of said shaft when said shaft exceeds a predetermined speed, and second damping means disposed adjacent said first damping means to dampen vibrations of said shaft when said shaft rotates at a speed no greater than the predetermined speed.

2. The combination according to claim 1 in which said member is rotatably supported by said first damping means.

3. The combination according to claim 2 in which said first damping means includes a housing having a plurality of concentric rings mounted therein with the smallest of said concentric rings having its inner surface adjacent the outer surface of said member, said rings being spaced predetermined distances from each other when said shaft is at rest, and a fluid between said rings, said fluid functioning as a damper by absorbing energy from said shaft when said shaft rotates at a speed greater than the predetermined speed.

4. The combination according to claim 3 including means for introducing a pressurized fluid between and about said rings.

5. The combination according to claim 3 in which said second damping means includes chamber means having fluid therein, said chamber means having a flexible wall responsive to vibrations of said shaft when said shaft is rotating at a speed no greater than the predetermined speed.

6. The combination according to claim 5 in which said second damping means is supported by said housing and is concentric to said shaft when said shaft is at rest.

7. The combination according to claim 5 in which said chamber means of said second damping means comprises at least two separate annular chambers.

8. The combination according to claim 7 wherein said annular chambers are filled with a fluid and disposed concentrically about said rings when said shaft is at rest.

9. In combination, a rotatable shaft, a damping and support assembly for said rotatable shaft comprising first damping means adapted to rotatably support said shaft and dampen vibrations of said shaft when said shaft exceeds a predetermined speed and second damping means cooperating with said first damping means to dampen vibrations of said shaft when said shaft rotates at a speed no greater than the predetermined speed.

10. The combination according to claim 9 wherein said first damping means vibrates with said shaft when said shaft rotates at a speed no greater than the predetermined speed and said second damping means is actuated by the movement of said first damping means.

11. The combination according to claim 9 wherein said second damping means comprises a housing and an annular chamber disposed within said housing about said first damping means, said annular chamber having a resilient wall and being filled with a fluid.

12. The combination according to claim 11 wherein said second damping means is fixed relative to said shaft and said first damping means is adapted to move laterally in response to the vibrations of said shaft when said shaft rotates at a speed no greater than the predetermined speed, the lateral movements of said first damping means being damped by said annular chamber of said second damping means.

13. In combination, a rotatable shaft, a damping and support assembly for said rotatable shaft comprising a cylindrical member secured to said shaft; first damping means cooperating with said member to rotatably support said shaft intermediate its ends and to dampen vibrations of said shaft when said shaft exceeds a predetermined speed, said first damping means comprising a plurality of rings concentrically disposed about said cylindrical member, said predetermined spaces being filled with a pressurized fluid, said concentric rings being capable of moving laterally relative to the longitudinal axis of said shaft to dampen shaft vibrations when said shaft exceeds a predetermined speed, second damping means disposed concentrically about said first damping means and adapted to dampen the vibrations of said shaft when said shaft rotates at a speed no greater than said predetermined speed, said second damping means comprising an annular flexible chamber secured to first said damping means, said annular chamber being filled with a damping fluid, said second damping means being fixed relative to said shaft and adapted to dampen the vibrations of said rotating shaft by damping the lateral motions of said first damping means when said shaft rotates at a speed no greater than the predetermined speed; and means for introducing a pressurized fluid between and about said concentric rings.

References Cited

UNITED STATES PATENTS

| | | | |
|---|---|---|---|
| 656,310 | 8/1900 | Warburton | 308—9 |
| 2,614,896 | 10/1952 | Pierce | 308—184 |
| 3,101,979 | 8/1963 | Mard | 308—184 |
| 3,249,390 | 5/1966 | Schwartzman | 308—122 |

FOREIGN PATENTS 926,398    4/1955    Germany.

MARTIN P. SCHWADRON, Primary Examiner

FRANK SUSKO, Assistant Examiner

U.S. Cl. X.R.

308—26